(12) United States Patent
Yamazaki

(10) Patent No.: US 6,526,059 B1
(45) Date of Patent: Feb. 25, 2003

(54) QUALITY MONITORING APPARATUS AND METHOD FOR ATM SWITCHING SYSTEMS

(75) Inventor: Makoto Yamazaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/358,487

(22) Filed: Jul. 22, 1999

(30) Foreign Application Priority Data

Jul. 22, 1998 (JP) ............................................ 10-206757

(51) Int. Cl.[7] .............................................. H04L 12/56
(52) U.S. Cl. .................................. 370/395.1; 370/230.1
(58) Field of Search .............................. 370/395.1, 233, 370/253, 234, 235, 232, 397, 389, 392, 394, 236, 230.1, 231, 235.1

(56) References Cited

U.S. PATENT DOCUMENTS 6,233,240 B1 * 5/2000 Barbas et al. ............... 370/395
6,097,699 A * 8/2000 Chen et al. .................. 370/231
6,181,680 B1 * 1/2001 Nagata et al. ............... 370/248

* cited by examiner

*Primary Examiner*—Ken Vanderpuye
(74) *Attorney, Agent, or Firm*—Foley & Lardner

(57) ABSTRACT

In a quality monitoring apparatus for monitoring the quality of ATM cells stored in a buffer, a programmable counter is provided for decrementing a count value in response to each cell forwarded from the buffer to define a time window of variable size. Responsive to each cell discarded from the buffer, a predetermined value is added to the count value of the programmable counter to produce a summed value and the programmable counter is updated with the summed value. A cell loss counter increments its count value in response to each cell that is discarded from the buffer within the time window. A decision circuit produces a low quality signal when the count value of the cell loss counter is greater than a threshold value.

12 Claims, 10 Drawing Sheets

JUMPING WINDOW CLR MONITOR

SLIDING WINDOW CELL-LOSS-RATE MONITOR

CLR MONITOR CIRCUIT

QUALITY MONITORING APPARATUS AND METHOD FOR ATM SWITCHING SYSTEMS

BACKGROUND OF THE INVENTION

1. Field of the Invention

The present invention relates generally to asynchronous transfer mode (ATM) switching systems, and more specifically the invention relates to monitoring the quality of ATM cells forwarded from a buffer according to their cell loss rate.

2. Description of the Related Art

In ATM switching systems, user traffic is monitored by a mechanism known as Usage Parameter Control (UPC) to determine if the user traffic violates the contract agreed upon between the user and the network. If the user traffic violates the contract or congestion occurs in the network traffic, user's cells are discarded. The discarded cells are monitored to determine the cell loss rate of the user traffic. The cell loss rate is checked against the quality-of-service (QoS) parameter requested by the user to determine if it satisfies the requested QoS parameter. If the user's QoS parameter is not satisfied, the restriction imposed on the user traffic is relaxed according to the cell loss rate.

Two prior art techniques are available to monitor the quality of ATM cells, i.e., the jumping window cell-loss-rate monitor and the sliding window cell-loss-rate monitor.

While the jumping window type is simpler to implement than the sliding window type, the performance of the jumping type monitor largely depends on the pattern of occurrences of discarded cells because of a fixed time window. The sliding window type monitor eliminates the drawback of the jumping window type monitor by using a number of window defining circuits that respond cyclically to discarded cells to define a number of sliding time windows. However, the sliding window type monitor is not simple to implement.

SUMMARY OF THE INVENTION

It is therefore an object of the present invention to provide a quality monitor apparatus and method that is simple to implement and eliminates the drawback of the prior art jumping window type monitor.

According to a first aspect of the present invention, there is provided a quality monitoring apparatus for monitoring the quality of ATM cells stored in a buffer, comprising window defining circuitry for incrementing a count value by a predetermined value in response to each cell discarded from the buffer and decrementing the count value by one in response to each cell forwarded from the buffer to define a time window of variable size, a cell loss counter for incrementing a count value in response to each cell discarded from the buffer within the time window, and decision circuitry for producing a low quality signal when the count value of the cell loss counter is greater than a threshold value.

According to a second aspect, the present invention provides a method of monitoring the quality of ATM cells stored in a buffer, comprising the steps of (a) incrementing a first count value by one in response to a cell discarded from the buffer, (b) incrementing a second count value by a predetermined value in response to the discarded cell, (c) decrementing the second count value by one in response to a cell forwarded from the buffer, (d) determining if the second count value is equal to zero, (e) if the second count value is not equal to zero, repeating the steps (a) to (d), and if the second count value is equal to zero, resetting the first count value to zero and repeating the steps (a) to (d), (f) determining if the first count value is greater than a threshold value, and (g) if the first count value is greater than the threshold value, producing a low quality signal and repeating the steps (a) to (f) and if the first count value is not greater than the threshold value, repeating the steps (a) to (f).

According to a third aspect, the present invention provides an ATM switching system comprising a self-routing switch, a cell buffer connected to the self-routing switch, the cell buffer being partitioned into a plurality of storage locations corresponding to different service classes, address control circuitry connected to the self-routing switch for producing an address signal associating each ATM cell delivered from the self-routing switch with one of the storage locations and storing the ATM cell into, and reading a stored ATM cell out of, the associated storage location, a plurality of quality monitors corresponding respectively to the storage locations of the cell buffer; and bandwidth control circuitry for controlling the storage locations of the cell buffer according to output signals of the quality monitors. Each of the quality monitors includes window defining circuitry for incrementing a count value by a predetermined value in response to each cell discarded from a corresponding storage location of the cell buffer and decrementing the count value by one in response to each cell forwarded from the corresponding storage location to define a time window of variable size, a cell loss counter for incrementing a count value in response to each cell discarded from the corresponding storage location within the time window, and decision circuitry for producing a low quality signal as an output signal of the quality monitor when the count value of the cell loss counter is greater than a threshold value.

BRIEF DESCRIPTION OF THE DRAWINGS

The present invention will be described in further detail with reference to the accompanying drawings, in which.

DETAILED DESCRIPTION

Before proceeding with the detailed description of the present invention, it may be useful to provide an explanation of the prior art techniques for ATM switching systems with reference to FIGS. 1 to 5. Assume that the acceptable cell loss rate of a given quality-of-service (QoS) parameter is $10^{-n}$, where n is a positive integer which is usually 4 for voice transmission and 7 for data transmission. Thus, the QoS parameter of the voice transmission represents a service class in which there is a likelihood of N cells being discarded for every $N \times 10^4$ incoming cells. If the number of such discarded cells exceeds a threshold value N+1, it is determined that the quality of that service class is deteriorating. The value of this threshold is known as the order of protection and N is a positive integer equal to or greater than unity.

Figure 1:
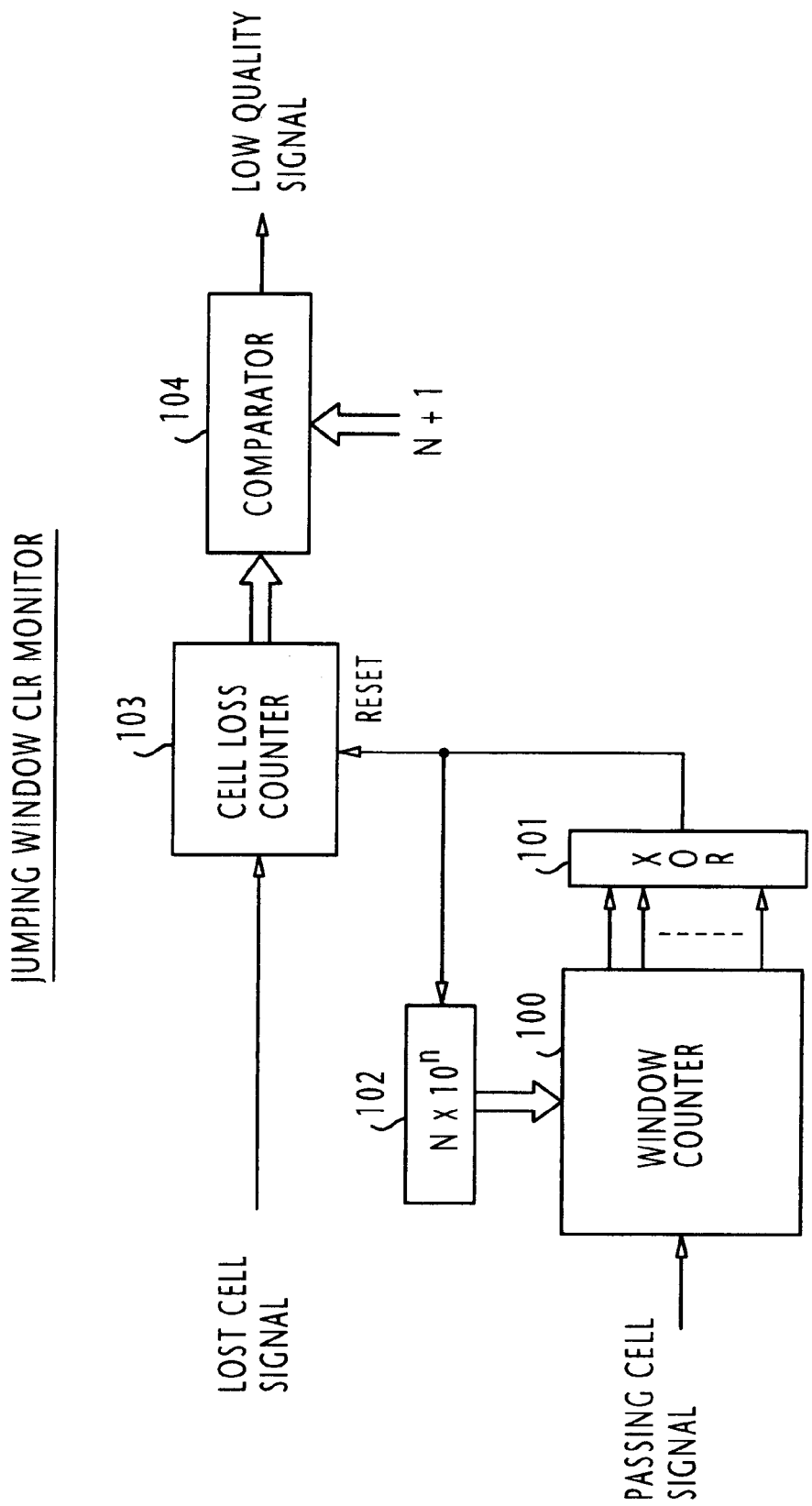
FIG. 1 is a block diagram of a prior art jumping window cell-loss-rate monitor.

As shown in FIG. 1, the prior art jumping window cell-loss-rate monitor of the given QoS parameter includes a window counter 100 that receives a passing cell signal from a cell buffer corresponding to the given QoS parameter, indicating that an ATM cell has passed through and delivered from that buffer. Window counter 100 is a programmable counter which can be loaded with an initial value before a count operation begins. This initial value is represented by $N \times 10^n$ and stored in a register 102. At the beginning of its count operation, the counter window 100 is loaded with the initial value which is then decremented whenever an ATM cell is delivered from the corresponding cell buffer.

The time interval of counter 100 from the initial state to the zero state defines a "window" for a cell loss counter 103. Within this window, the cell loss counter 103 is allowed to increment its count in response to a lost cell signal which indicates that an ATM cell is discarded from the corresponding cell buffer. The output of the cell loss counter 103 is compared in a comparator 104 with the threshold value N+1. When the comparator output is equal to or greater than the threshold value, a low quality signal is produced by the comparator 104, indicating that the quality of the given service class is deteriorating.

Figure 2:
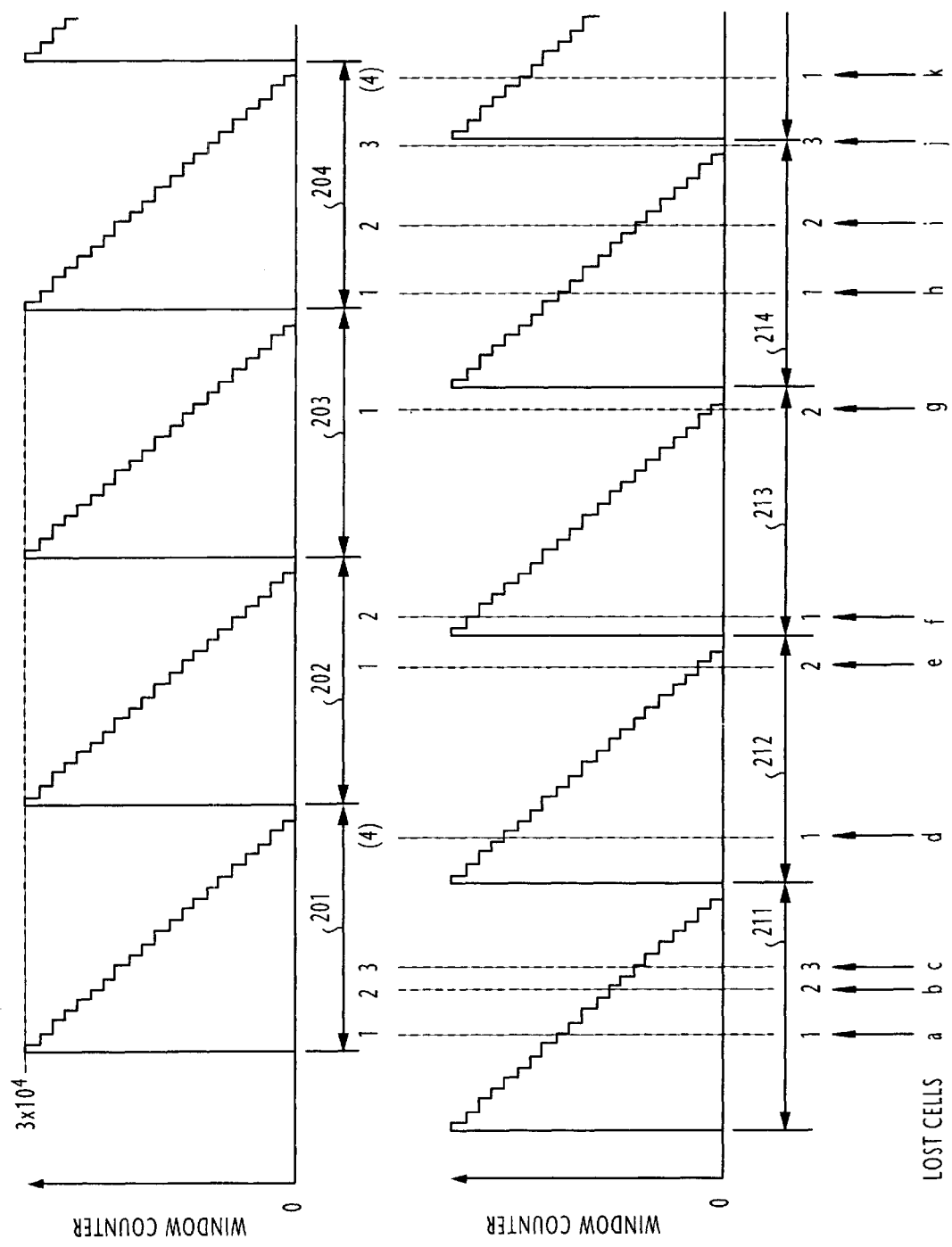
FIG. 2 is a timing diagram of the CLR monitor of FIG. 1.

As shown in FIG. 2, the occurrences of window sequences of window counter 100 are indeterminate with respect to the occurrences of lost cells designated "a" to "k" which occur at random intervals. If N=3 (i.e., the order of protection is 4), the window counter 100 is initialized to a count $3 \times 10^4$ at constant window intervals. First and second cases of window sequences are illustrated in the upper and lower parts of FIG. 2. respectively. It is seen that the first four lost cells "a" through "d" fall within a first window period 201. Since the threshold value 4 is exceeded by the output of cell loss counter when the fourth lost cell occurs, a low quality signal is produced. Likewise, a low quality signal is produced when lost cells "h" to "k" occur within a window 204. No low quality indication is given during other windows 202 and 203.

On the other hand, if the window sequences are shifted to the left with respect to those of the first case as shown in the lower part of FIG. 2, the window counter is decremented to zero each time before the cell loss counter exceeds the threshold N+1, and hence no low quality signal is produced in any of windows 211 through 214.

Thus, the low quality indication of the prior art jumping window CLR monitor significantly varies depending on the time instants at which cells are discarded.

Figure 3:
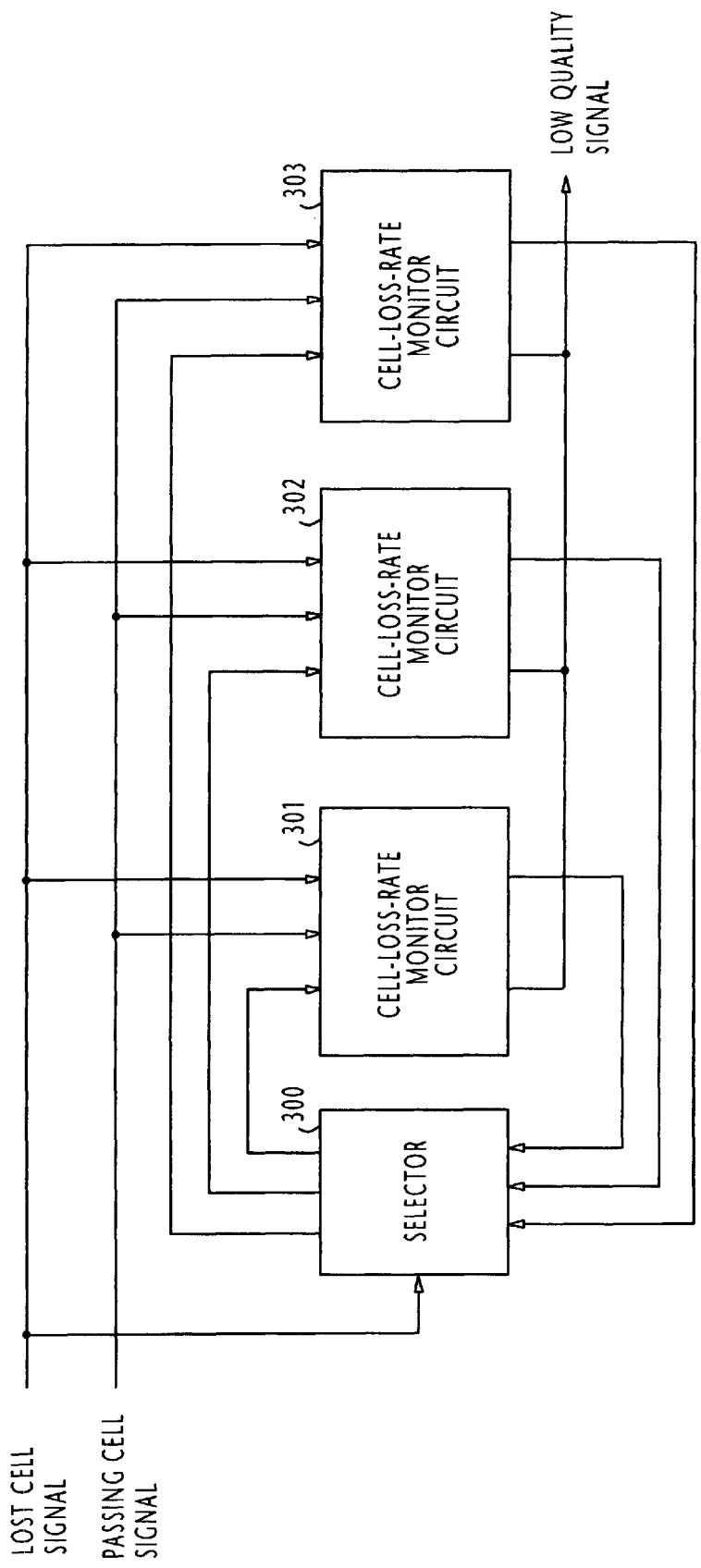
FIG. 3 is a block diagram of a prior art sliding window CLR monitor.

Another prior art technique known as a sliding window CLR monitor for a service class is shown in FIG. 3, which consists of three CLR monitor circuits 301, 302 and 303, and a selector 300. Selector 300 is responsive to a successive lost cell signal for activating the CLR monitor circuits 301, 302, 303 in succession. When each of these monitor circuits is activated, it starts to define a window and increments its cell-loss count in response to a passing cell signal. As a result, lost cell signals are not used to open a window when all windows of the monitor are open.

Figure 4:
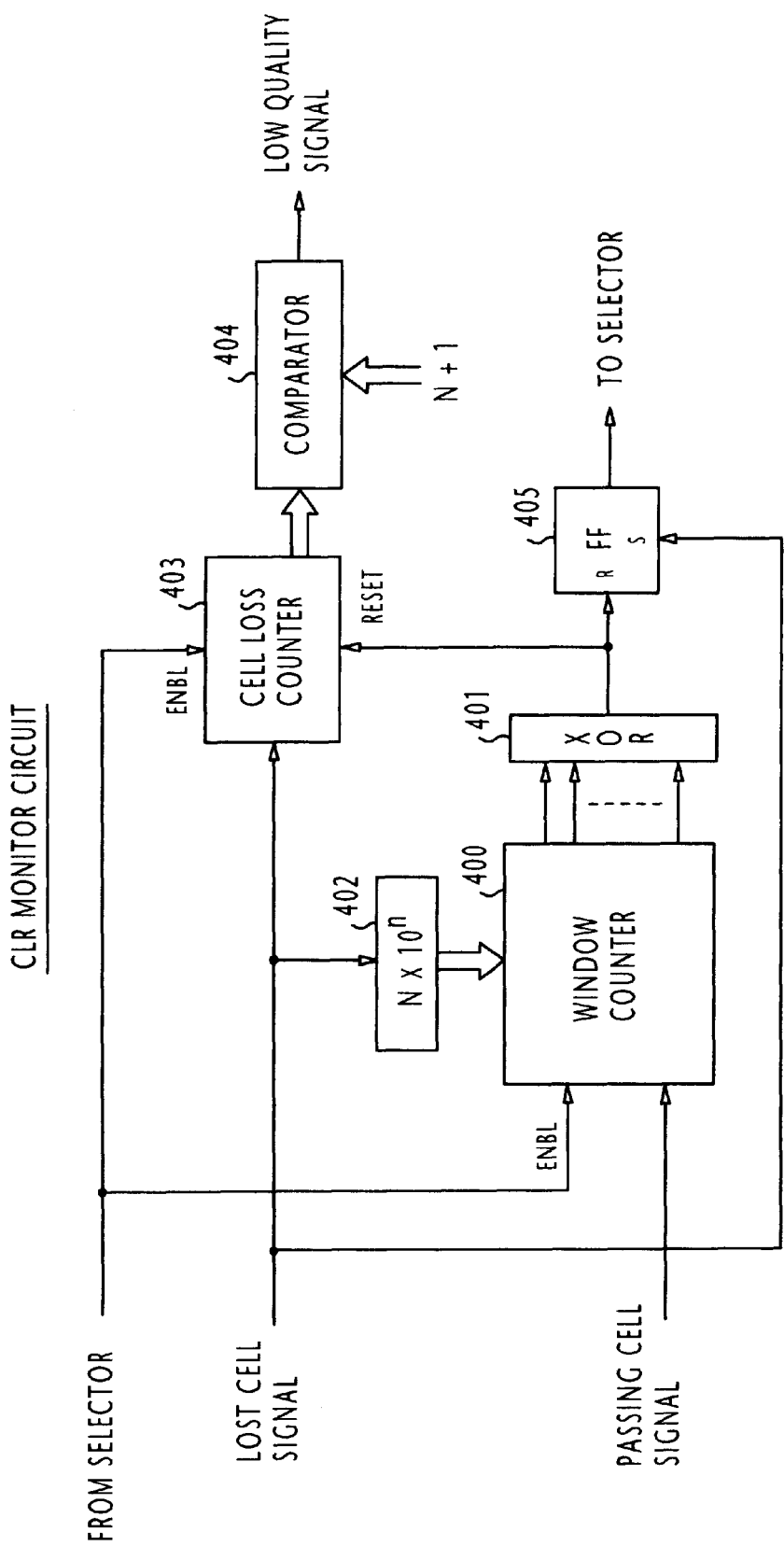
FIG. 4 is a block diagram showing details of each CLR monitor circuit of FIG. 3.

As shown in detail in FIG. 4, each of the CLR monitor circuits 301 to 303 includes a window counter 400 which is loaded with the initial value $N \times 10^n$ supplied from a register 402 when a lost cell signal is supplied from the corresponding cell buffer. The initial value of the window counter 400 is then decremented in response to a passing cell signal from the corresponding cell buffer when a cell is delivered.

An exclusive-OR gate 401 resets a cell loss counter 403 when the window counter output is equal to zero. When one of the monitor circuits is selected, the window counter of the selected monitor circuit is loaded with the initial count value and starts decrementing the count value in response to a passing cell signal. Simultaneously, the cell loss counter of the selected monitor circuit is enabled and starts counting lost cell signals until it is reset by the exclusive-OR gate 401.

Comparator 404 produces a low quality signal when the cell loss counter output is equal to or greater than the threshold value N+1. A flip-flop 405 is provided to set up a flag in response to a lost cell signal and reset the flag in response to the output of the exclusive-OR gate 401. The output of the flip-flop 405 of each monitor circuit is coupled to the selector to indicate that the window of the monitor circuit is open.

Figure 5:
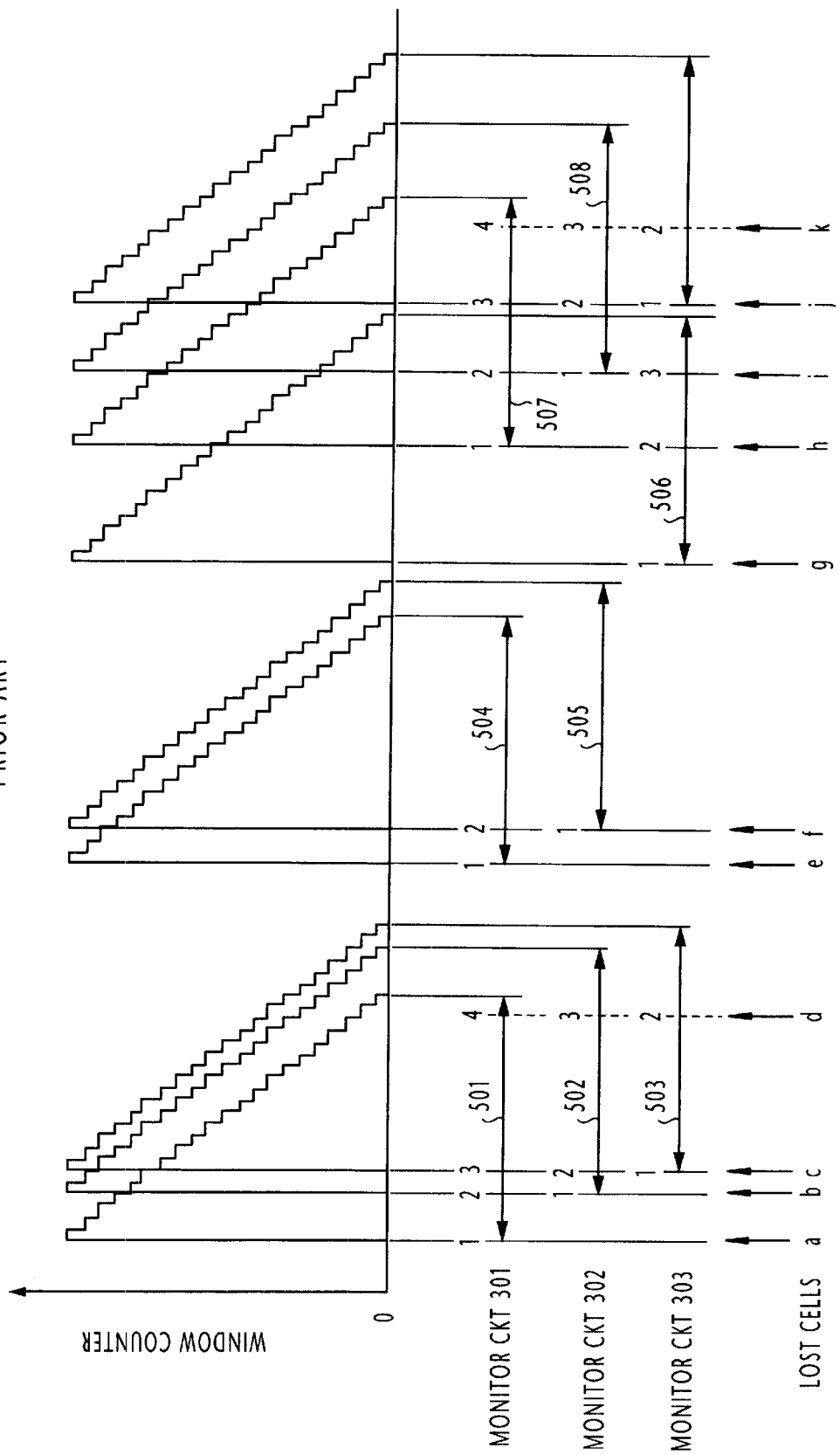
FIG. 5 is a timing diagram of the prior art CLR monitor of FIG. 3.

The operation of the sliding window CLR monitor of FIG. 3 is shown in FIG. 5 in which lost cell signals "a" through "k" are produced in the same instants of time as those in FIG. 2.

In response to lost cell signals "a", "b" and "c", monitor circuits 301, 302 and 303 are sequentially selected, enabling their window counter to open their windows 501, 502 and 503 of same period (i.e., $3 \times 10^4$) as shown in FIG. 5. The cell loss count values of the monitor circuits 301, 302 and 303 are respectively incremented to "3", "2" and "1". Since the fourth lost cell signal "d" is within the window 501, it is counted by the monitor circuit 301 to produce a low quality signal. In response to lost cell signals "e" and "f", the monitor circuits 301 and 302 successively open windows 504 and 505 and respectively increment their counts to "2" and "1". These windows lapse before the next lost cell signal "g" occurs, which causes the monitor circuit 303 to produce a window 506 and increments its count to "1". Lost cell signals "h" and "i" cause the monitor circuits 301 and 302 to open windows 507 and 508, causing the monitor circuits 301, 302 and 303 to respectively increment their count values to "2", "1" and "3". Lost cell signals "j" and "k" occur within the window 507, producing a low quality signal from the monitor circuit 301.

Since windows are successively open, the probability of detecting a low quality condition is higher than the FIG. 1 prior art. However, it is disadvantageous to use more than one monitor circuit to implement a sliding window CLR monitor.

Figure 6:
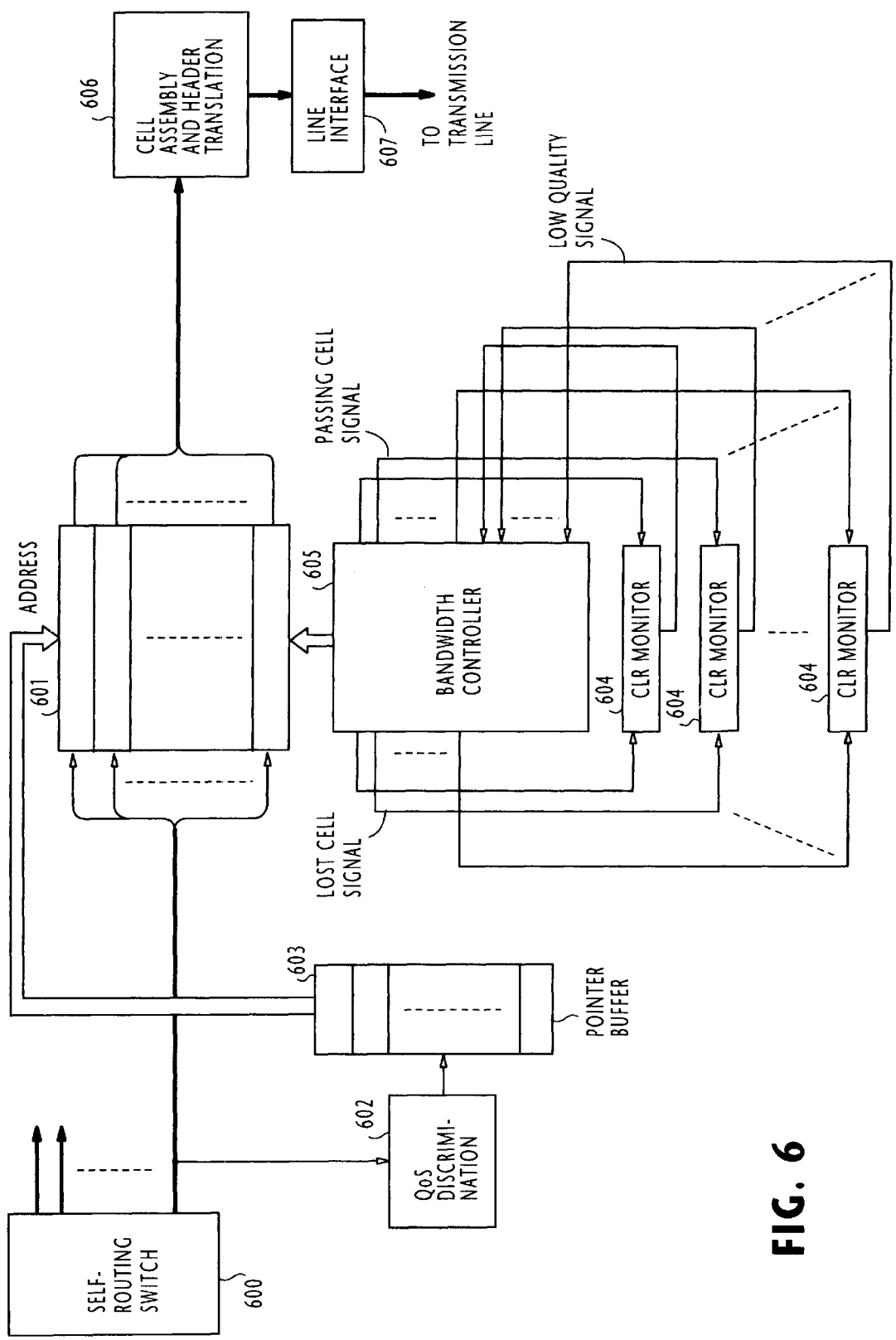
FIG. 6 is a block diagram of a portion of an ATM switching system incorporating the present invention.

FIG. 6 is a block diagram of a portion of an ATM switching system in which the present invention is incorporated. The switching system includes a self-routing switch 600 from which ATM cells of different service classes are fed to a common cell buffer 601 where they are stored into a plurality of storage locations corresponding to the service classes, or QoS parameters of the cells.

For this purpose, a QoS discrimination circuit 602 is connected to the self-routing switch to examine the header of each cell to identify the QoS parameter of the cell to produce an address pointer corresponding to the service class of the cell. The address pointer produced by the QoS discrimination circuit is stored in a corresponding location of a pointer buffer 603. Each address pointer stored in this pointer buffer is supplied to the cell buffer as an address for specifying the storage location of ATM cells of the corresponding service class.

A plurality of cell-loss-rate monitors 604 are provided corresponding respectively to the storage locations of the common cell buffer 601. The monitors are connected to a bandwidth controller 605 which controls the capacity of the storage locations of the cell buffer according to corresponding output signals of the cell-loss rate monitors so that the bandwidth required for the associated service class is guaranteed.

More specifically, the bandwidth controller monitors the contents of each storage location to detect when a cell is forwarded from the buffer and when a cell is discarded from the buffer. When a cell is forwarded from the buffer, the bandwidth controller supplies a "passing cell signal" to a corresponding one of cell-loss-rate monitors and when a cell is discarded, it supplies a "lost cell signal" to the corresponding monitor.

The outputs of the storage locations of the common cell buffer 601 are connected to a cell assembly and header translation circuit 606 where ATM cells of different service classes of the same destination are assembled and a header (VCI/VPI) translation is performed. Following the header translation, the cells are forwarded to a transmission line via a line interface 607.

Figure 7:
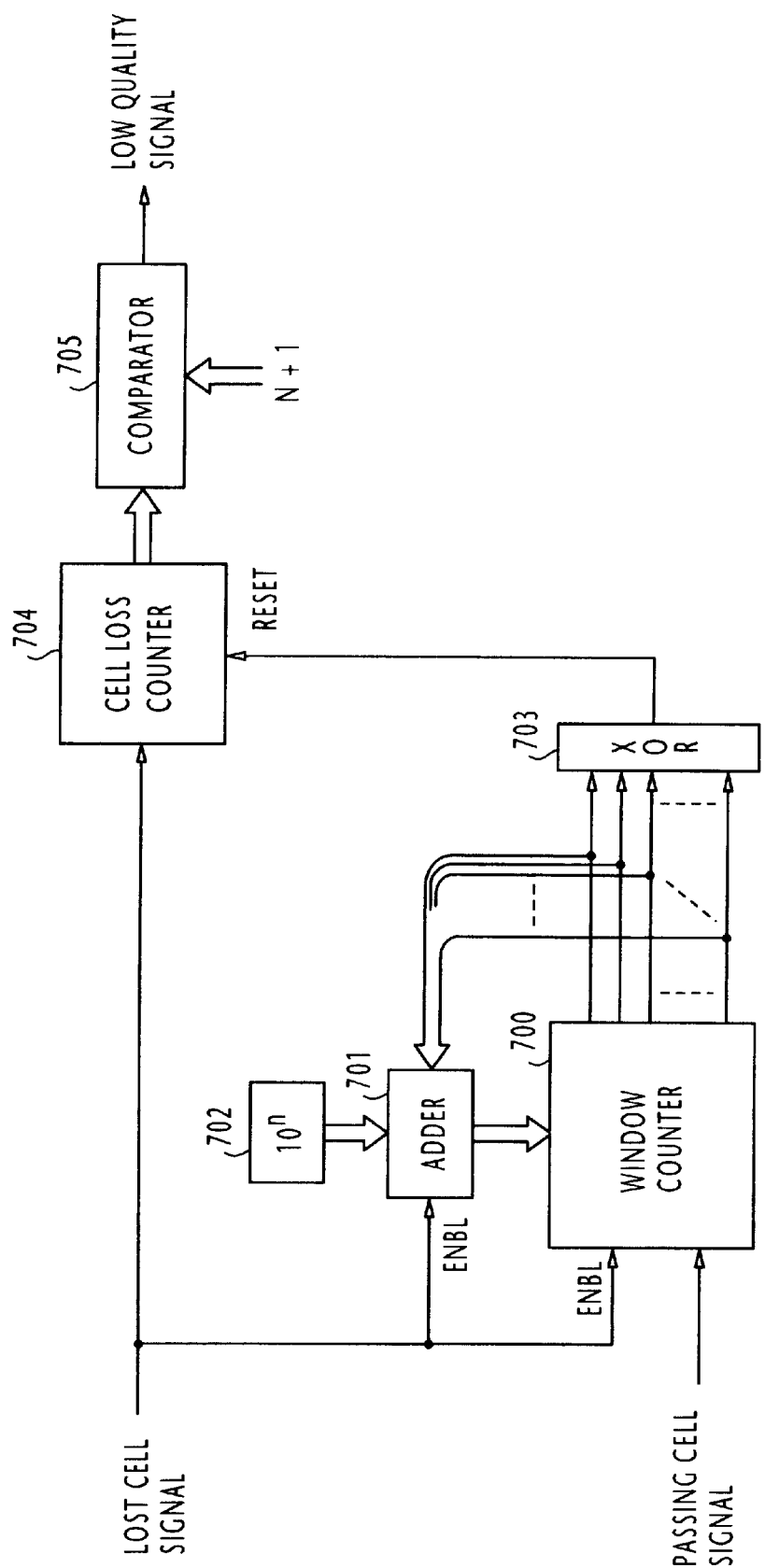
FIG. 7 is a block diagram of each CLR monitor of FIG. 6.

As shown in FIG. 7, each cell-loss-rate monitor 604 includes a window counter 700, an adder 701, and a register 702 holding a value $10^n$, i.e., the reciprocal of the acceptable cell loss of the service class of the monitor 604. An exclusive-OR gate 703 is connected to the outputs of window counter 700. The lost cell signal from the corresponding storage location of the cell buffer is supplied to the enable terminal of the window counter as well as to the enable terminal of the adder.

In response to a lost cell signal, the adder is enabled to add the value $10^n$ to the current value of the window counter, while the window counter starts a count operation if that current value was zero or resets its count value to the summed value if that count value was non-zero. The window counter is decremented by one in response to a passing cell signal from the corresponding storage location of the cell buffer.

It is seen therefore that the size of the window defined by the window counter is variable in proportion to the number of lost cell signals it receives while its window is open. Within this variable window, the cell loss counter 704 increments its count value by counting lost cell signals. When this lost cell count is equal to or greater than the threshold N+1 (where N is an integer equal to or greater than 1), the comparator 705 supplies a low quality signal to the bandwidth controller 605.

Figure 8:
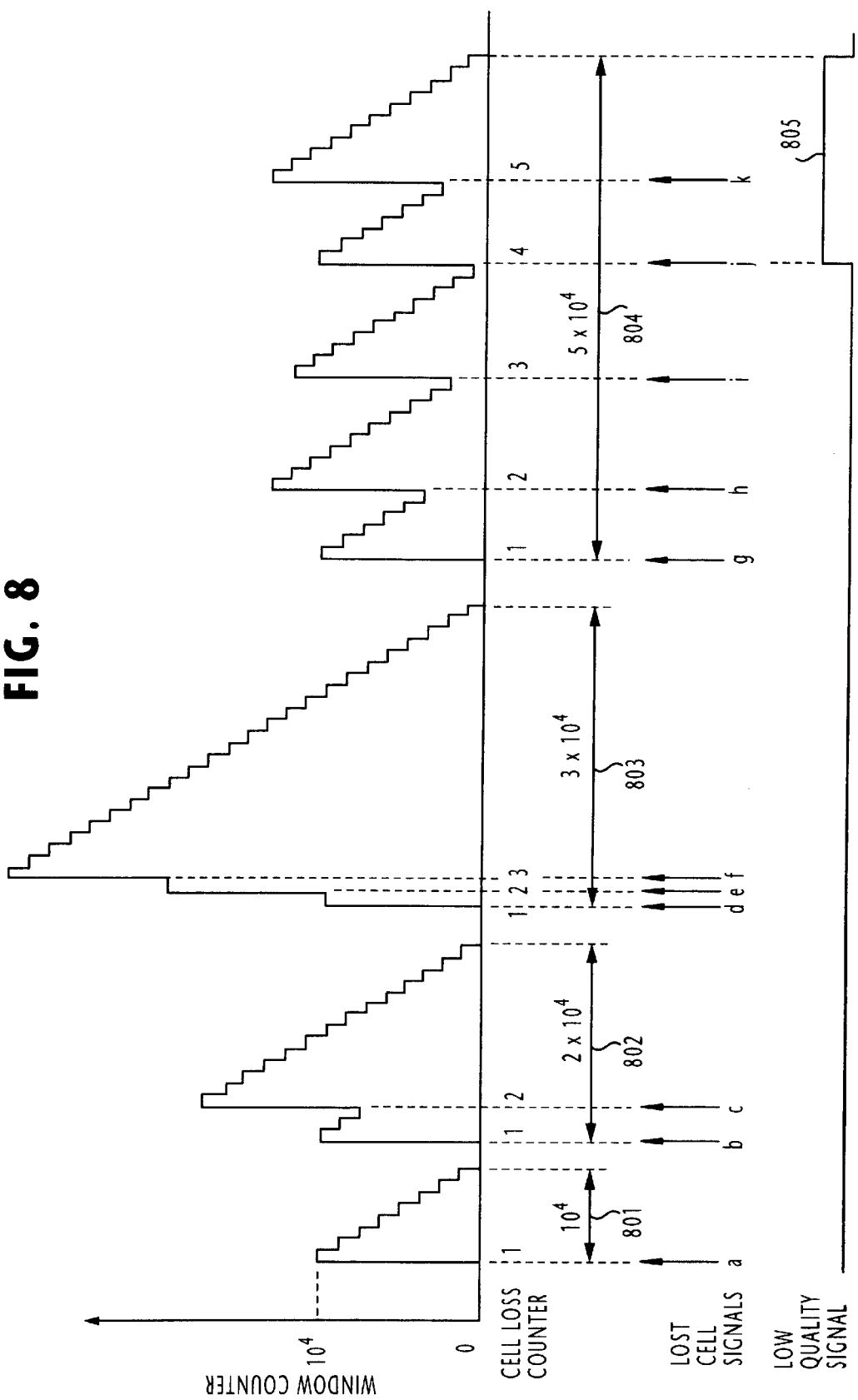
FIG. 8 is a timing diagram for explaining the operation of the monitor of FIG. 7.

The operation of the circuit of FIG. 7 will be described with reference to the timing diagram of FIG. 8 by assuming that the integers n and N are 4 and 3, respectively.

In response to a lost cell signal "a", the window counter 700 is activated, opening a window 801 with an initial count value of $10^4$. If a sequence of $10^4$ consecutive cells are passed through the corresponding storage location of the cell buffer with no cell loss, the window counter decreases its count to zero, closing the window 801 of size $10^4$. Since one cell loss has occurred within the sequence of $10^4$ consecutive cells, the cell loss rate of this sequence does not exceed the acceptable value of $10^{-4}$. No low quality signal is thus produced.

In response to a lost cell signal "b", the window counter 700 is activated again, opening a window 802 with the initial count value of $10^4$. If a lost cell signal "c" occurs immediately following the lost cell signal "b", the count value $10^4$ is added to the current count value. If no cell loss occurs thereafter until the window counter decreases its count to zero, the size of this window is $2 \times 10^4$. Since two cell losses have occurred within the sequence of $2 \times 10^4$ consecutive cells, the cell loss rate of this sequence does not exceed the acceptable value of $10^{-4}$ and no low quality signal is produced.

Similar events occur in response to lost cell signals "d", "e" and "f". The initial value of the window counter is successively increased to $3 \times 10^4$, setting a window 803. If no cell loss occurs thereafter until the window counter is decremented to zero, the window size is $3 \times 10^4$. Since three cell losses have occurred within this window, the cell loss rate of this sequence does not exceed the acceptable value of $10^{-4}$ and no low quality signal is produced.

If five lost cell signals "g" to "k" occur in a sequence of $5 \times 10^4$ consecutive cells, the window counter will be incremented by $10^4$ five times to define a window 804 and the comparator 705 will produce a low quality signal 805 which lasts for a period starting at the signal "j" and terminating at the end of the window 804. According to the low quality signal, the bandwidth controller 605 controls the capacity of the corresponding storage location of the cell buffer. As a result of this control, the amount of lost cells is reduced and the low quality signal ceases to exist.

Figure 9:
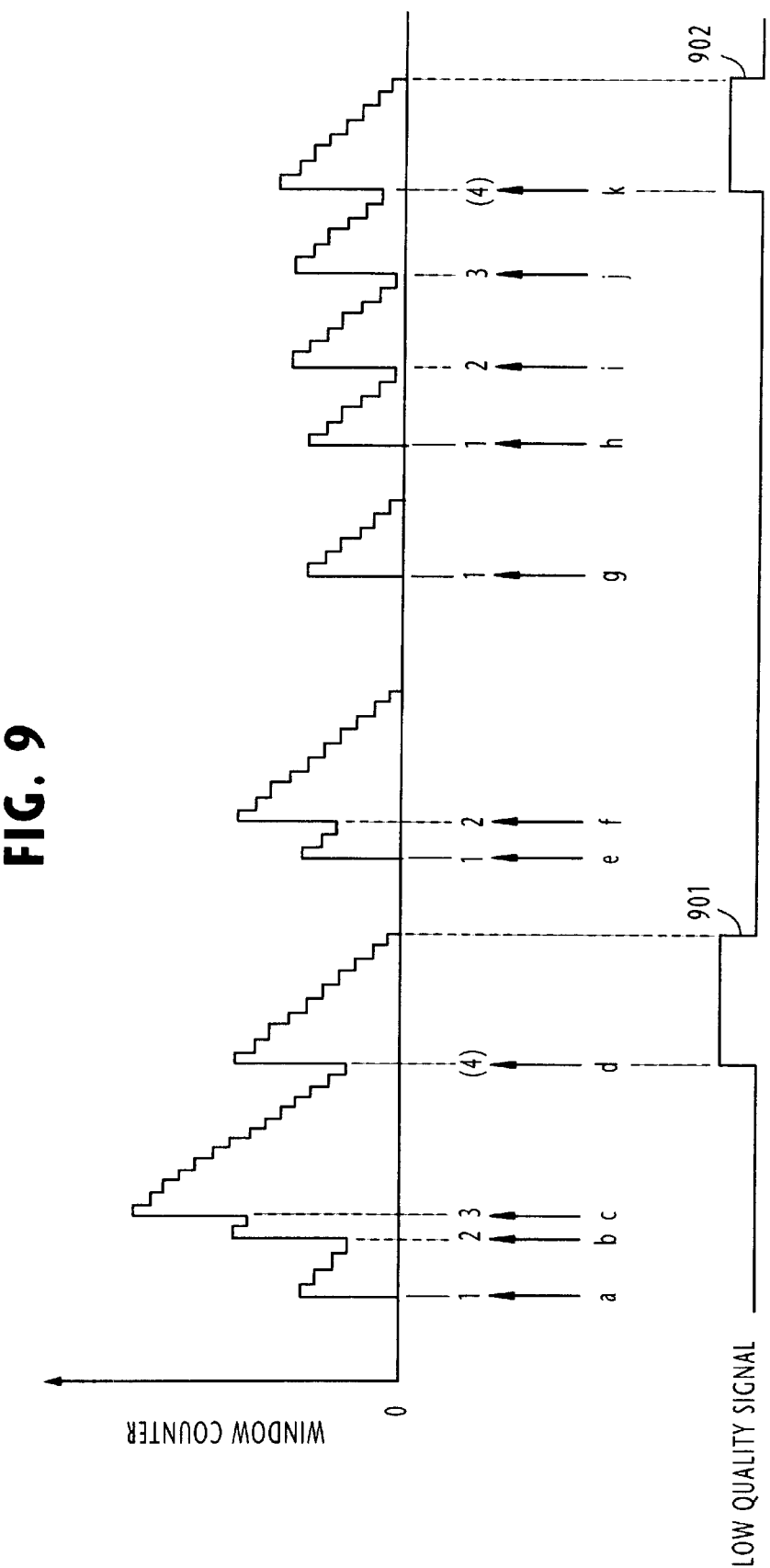
FIG. 9 is a timing diagram for comparing the operation of the monitor of FIG. 7 with the operation of the prior art cell-loss-rate monitors.

In order to illustrate the advantage of this invention over the two prior art techniques, FIG. 9 shows another timing diagram that compares favorably with the timing diagrams of FIGS. 2 and 5 by using the same pattern of occurrences of discarded cells. As shown, low quality signals 901 and 902 are generated respectively in response to the lost cell signals "d" and "k" with the same reliability as that of the sliding window CLR monitor, whilusing substantially the same amount of hardware as that of the jumping window CLR monitor.

Figure 10:
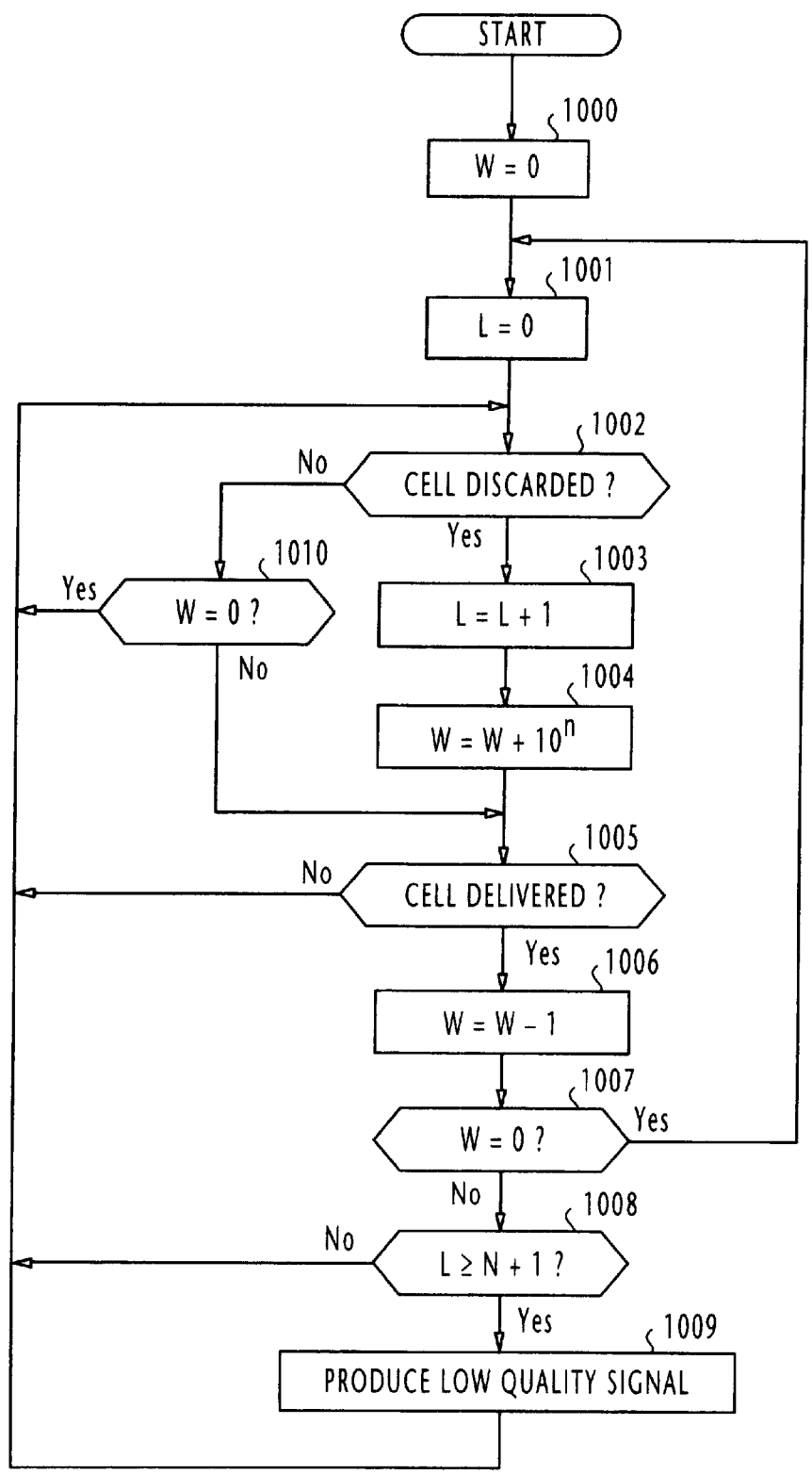
FIG. 10 is a flowchart for implementing the present invention.

FIG. 10 shows a flowchart in which the variable window CLR monitor of this invention is implemented in a stored program approach. The program routine begins with step 1000 to initialize a window variable W to zero. At step 1001, the routine sets a cell loss variable L to zero. The routine proceeds to decision step 1002 to check to see if a cell is discarded.

If a cell is discarded from the buffer, the routine proceeds from step 1002 to step 1003 to increment the cell loss variable L by one. The routine proceeds to step 1004 to increment the window variable W by $10^n$, opening a window, and proceeds to decision step 1005 to check to see if there is a cell delivered from the cell buffer. If there is one, the routine proceeds to step 1006 to decrement the variable W by one and inquires whether the variable W is equal to zero (step 1007).

If the decision at step 1002 is negative, control proceeds to step 1010 to check to see if W=0. If no cells are discarded and no window is open, the window variable W is equal to 0 and the routine loops steps 1002 and 1010. After the window is open at step 1004, steps 1002 and 1010 will be executed again and an affirmative decision at step 1010 routes control to step 1005. As a result, once a window is open, the routine loops steps 1002, 1010 and 1005 to check for the presence of a discarded cell and a forwarded cell.

If the occurrence of a discarded cell is detected at step 1002 after the window is open, steps 1003 through 1008 are repeatedly executed and the variable W is successively decremented towards zero.

If the window variable W is decremented to zero, the routine returns from step 1007 to step 1001 to restart the operation by resetting the variable L to zero. Otherwise, the routine proceeds to step 1008 to check to see if the cell loss variable L is equal to or greater than the threshold value N+1. If the cell loss variable L is smaller than the threshold value N+1, control returns from step 1008 to step 1002. If L is equal to or greater than the threshold, a low quality signal is produced at step 1009 and control returns to step 1002.

What is claimed is:

1. A quality monitoring apparatus for monitoring the quality of ATM cells stored in a buffer, comprising:

window defining circuitry for incrementing a count value by a predetermined value in response to each cell discarded from said buffer and decrementing the count value by one in response to each cell forwarded from said buffer to define a time window;

a cell loss counter for incrementing a count value in response to each cell discarded from said buffer within said time window; and decision circuitry for producing a low quality signal when the count value of the cell loss counter is greater than a threshold value; said time window having a size that is expanded in response to discarded cells.

2. The quality monitoring apparatus of claim 1, wherein said predetermined value is equal to $10^n$ and said threshold value is equal to N, where n and N are integers equal to or greater than unity.

3. The quality monitoring apparatus of claim 1, wherein said predetermined value is equal to the reciprocal of an acceptable cell loss rate of the ATM cells stored in said buffer.

4. The quality monitoring apparatus of claim 1, further comprising bandwidth control circuitry for controlling said buffer according to the low quality signal.

5. The quality monitoring apparatus of claim 1, wherein said window defining circuitry includes:

a programmable counter for decrementing a count value in response to each cell forwarded from said buffer;

an adder responsive to each cell discarded from said buffer for summing said predetermined value to the count value of said programmable counter to produce a summed value and updating the count value of the programmable counter with the summed value; and a resetting circuit for resetting the cell loss counter when the count value of said programmable counter is equal to zero.

6. A method of monitoring the quality of ATM cells stored in a buffer, comprising the steps of:

a) incrementing a first count value by one in response to a cell discarded from the buffer;

b) incrementing a second count value by a predetermined value in response to the discarded cell;

c) decrementing the second count value by one in response to a cell forwarded from the buffer;

d) determining if the second count value is equal to zero;

e) if the second count value is not equal to zero, repeating the steps (a) to (d), and if the second count value is equal to zero, resetting the first count value to zero and repeating the steps (a) to (d);

f) determining if the first count value is greater than a threshold value; and g) if the first count value is greater than the threshold value, producing a low quality signal and repeating the steps (a) to (f) and if the first count value is not greater than the threshold value, repeating the steps (a) to (f).

7. The method of claim 6, wherein said predetermined value is equal to $10^n$ and said threshold value is equal to N, where n and N are integers equal to or greater than unity.

8. The method of claim 7, wherein said predetermined value is equal to the reciprocal of an acceptable cell loss rate of the ATM cells stored in said buffer.

9. An ATM switching system comprising:

a self-routing switch;

a cell buffer connected to the self-routing switch, the cell buffer being partitioned into a plurality of storage locations corresponding to different service classes;

address control circuitry connected to the self-routing switch for producing an address signal associating each ATM cell delivered from said self-routing switch with one of said storage locations and storing the ATM cell into, and reading a stored ATM cell out of, the associated storage location;

a plurality of quality monitors corresponding respectively to said storage locations of the cell buffer; and bandwidth control circuitry for controlling said storage locations of the cell buffer according to output signals of said quality monitors; and each of the quality monitors including:

window defining circuitry for incrementing a count value by a predetermined value in response to each cell discarded from a corresponding storage location of said cell buffer and decrementing the count value by one in response to each cell forwarded from said corresponding storage location to define a time window of variable size;

a cell loss counter for incrementing a count value in response to each cell discarded from said corresponding storage location within said time window; and decision circuitry for producing a low quality signal as an output signal of the quality monitor when the count value of the cell loss counter is greater than a threshold value.

10. The ATM switching system of claim 9, wherein said predetermined value is equal to $10^n$ and said threshold value is equal to N, where n and N are integers equal to or greater than unity.

11. The ATM switching system of claim 10, wherein said predetermined value is equal to the reciprocal of an acceptable cell loss rate of the ATM cells stored in said buffer.

12. The ATM switching system of claim 9, wherein said window defining circuitry includes:

a programmable counter for decrementing a count value in response to each cell forwarded from said buffer;

an adder responsive to each cell discarded from said buffer for summing said predetermined value to the count value of said programmable counter to produce a summed value and updating the count value of the programmable counter with the summed value; and a resetting circuit for resetting the cell loss counter when the count value of said programmable counter is equal to zero.

* * * * *